US012658202B1

(12) United States Patent
Traldi et al.

(10) Patent No.: US 12,658,202 B1
(45) Date of Patent: Jun. 16, 2026

(54) HIGH SPEED HEAD FAULT DETECTION CIRCUIT WITH PROGRAMMABLE CURRENT MIRROR

(71) Applicant: STMicroelectronics International N.V., Geneva (CH)

(72) Inventors: Matteo Alessio Traldi, Milan (IT); Alessio Facen, Macerata (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 19/041,673

(22) Filed: Jan. 30, 2025

(51) Int. Cl.
G11B 20/10 (2006.01)
G11B 5/455 (2006.01)

(52) U.S. Cl.
CPC ................................... G11B 5/455 (2013.01)

(58) Field of Classification Search
CPC ............... G11B 5/02; G11B 20/10027; G11B 20/10009; G11B 5/09; G11B 20/10; G11B 5/00; G11B 2005/0018; G11B 2005/0021
USPC ........................................ 360/32, 68, 67, 53
See application file for complete search history.

(56) References Cited

U.S. PATENT DOCUMENTS

| | | | |
|---|---|---|---|
| 6,353,914 B1 | 3/2002 | Emerson | |
| 6,487,034 B1 * | 11/2002 | Jiang | G11B 5/012 |
| | | | 360/68 |
| 6,687,064 B1 | 2/2004 | Jiang | |
| 7,969,677 B2 | 6/2011 | Gleason | |
| 9,318,153 B2 | 4/2016 | Trantham | |
| 2005/0105204 A1 | 5/2005 | Bloodworth | |

* cited by examiner

*Primary Examiner* — Nabil Z Hindi
(74) *Attorney, Agent, or Firm* — Slater Matsil, LLP

(57) ABSTRACT

According to an embodiment, a circuit for detecting faults in a hard disk drive head resistance includes a current digital-to-analog converter generating a scaled current proportional to a write output current through the head resistance. A programmable current mirror with bipolar transistor networks processes the scaled current using parallel-connected scaled replicas of an impedance matching network and a head resistance fault threshold. The current mirror generates mirror currents that flow through matched resistors to create threshold voltages. High-speed comparators with input buffer transistors compare differential voltages from an H-bridge writer output to the threshold voltages while preventing loading effects. A polarity detector maintains fault detection capability regardless of active H-bridge diagonal pairs.

20 Claims, 6 Drawing Sheets

700

702 — GENERATE A MIRROR CURRENT

704 — CONVERT SCALED MIRROR CURRENT TO THRESHOLD VOLTAGES

706 — COMPARE DIFFERENTIAL VOLTAGES TO THRESHOLD VOLTAGES

708 — GENERATE FAULT SIGNAL

200

300

600

700

702 — GENERATE A MIRROR CURRENT

704 — CONVERT SCALED MIRROR CURRENT TO THRESHOLD VOLTAGES

706 — COMPARE DIFFERENTIAL VOLTAGES TO THRESHOLD VOLTAGES

708 — GENERATE FAULT SIGNAL

HIGH SPEED HEAD FAULT DETECTION CIRCUIT WITH PROGRAMMABLE CURRENT MIRROR

TECHNICAL FIELD

The present disclosure generally relates to electronic devices and, in particular embodiments, to a high-speed head fault detection circuit with a programmable current mirror.

BACKGROUND

Hard disk drives (HDDs) serve as common data storage devices in computing systems. HDDs store data by writing magnetic patterns on rotating disks using magnetic heads. The magnetic heads include read and write elements for data storage and retrieval operations.

During write operations, a preamplifier circuit provides current signals to the write head element to generate magnetic fields for recording data bits on the disk surface. When operating properly, the write head element exhibits electrical characteristics, including a nominal resistance value, typically around 8 ohms. The write current path includes termination impedances to match transmission line characteristics between the preamplifier and write head.

The preamplifier writer circuit employs an H-bridge configuration with high-side and low-side drivers to generate bidirectional write currents through the head. Depending on the specific recording parameters, write current amplitudes may range from a few milliamperes to over 100 milliamperes. The termination impedance values can be programmable, with typical ranges from 30 to 45 ohms to accommodate different head and interconnect designs.

Changes in head resistance beyond normal ranges may indicate damage or degradation that could affect writing performance. Traditional monitoring approaches measure DC resistance characteristics of the write head element to detect potential faults or failures. The high operating speeds and fast pulse transitions in RF circuits place stringent timing requirements on fault detection implementations.

SUMMARY

Technical advantages are generally achieved by embodiments of this disclosure, which describe a high-speed head fault detection circuit with a programmable current mirror.

A first aspect relates to a circuit for detecting a fault in a head resistance of a hard disk drive, the circuit comprising a current digital-to-analog converter configured to generate a scaled current proportional to a write output current, wherein the write output current flows through the head resistance via an H-bridge writer output; a programmable current mirror comprising a first bipolar transistor network coupled to receive the scaled current, a scaled impedance matching network coupled to the first bipolar transistor network, a scaled fault threshold resistance coupled in parallel with the scaled impedance matching network, and a second bipolar transistor network configured to generate mirror currents based on the scaled impedance matching network and scaled fault threshold resistance; a pair of matched resistors coupled to receive the mirror currents and generate threshold voltages; and a comparator circuit configured to compare differential voltages from the H-bridge writer output to the threshold voltages, and generate a fault signal in response to detecting a fault condition.

A first aspect relates to a circuit for detecting a fault in a head resistance of a hard disk drive, the circuit comprising a current digital-to-analog converter configured to generate a scaled current proportional to a write output current, wherein the write output current flows through the head resistance via an H-bridge writer output; a programmable current mirror comprising a first bipolar transistor network coupled to receive the scaled current, a scaled impedance matching network coupled to the first bipolar transistor network, a scaled fault threshold resistance coupled in parallel with the scaled impedance matching network, and a second bipolar transistor network configured to generate mirror currents based on the scaled impedance matching network and scaled fault threshold resistance; a pair of matched resistors coupled to receive the mirror currents and generate threshold voltages; and a comparator circuit configured to compare differential voltages from the H-bridge writer output to the threshold voltages, and generate a fault signal in response to detecting a fault condition.

A second aspect relates to a method of detecting a fault in a head resistance of a hard disk drive, the method comprising generating a mirror current proportional to a write output current, wherein the write output current flows through the head resistance via an H-bridge writer output; converting the mirror current into threshold voltages; comparing differential voltages from the H-bridge writer output to the threshold voltages; and generating a fault signal in response to detecting a fault condition.

A third aspect relates to a write driver system for a hard disk drive, the write driver system comprising an H-bridge circuit configured to provide a write output current through a head resistance; an impedance matching network coupled between the H-bridge circuit and the head resistance; and a fault detection circuit comprising first and second voltage sources configured to generate threshold voltages based on the write output current and a parallel combination of the impedance matching network and a head resistance fault threshold; first and second comparators configured to compare differential voltages from the H-bridge circuit to the threshold voltages; and a polarity detector configured to generate a fault signal in response to detecting a fault condition.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
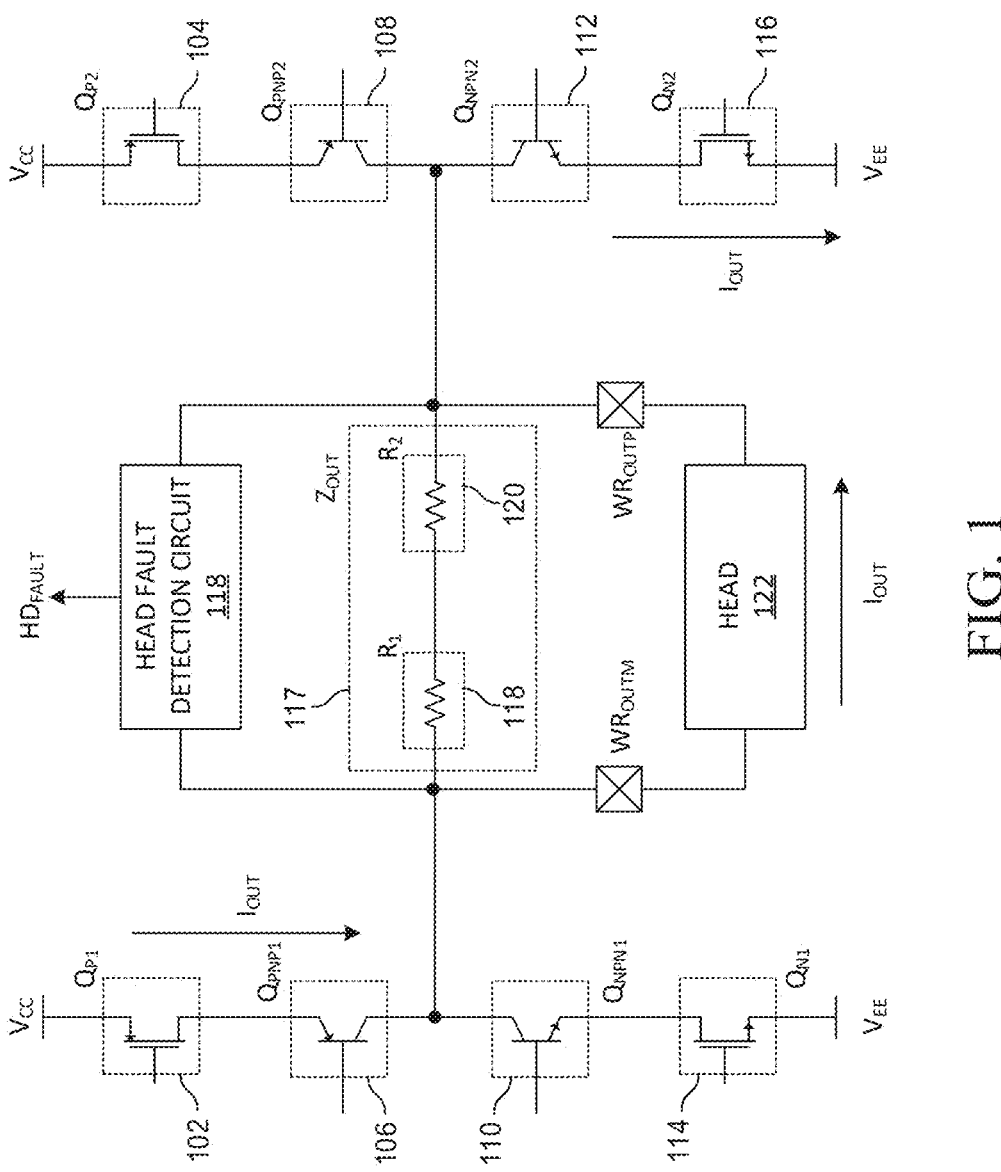
FIG. 1 is a schematic of a writer driver system implemented in a hard disk drive (HDD) preamplifier system.
Figure 1:

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the aspects described in this disclosure are described primarily in the context of hard disk drive pre-amplifier circuits and write head fault detection, it should also be appreciated that these aspects may also apply to other high-speed load detection applications. In particular, aspects of this disclosure may similarly apply to radio frequency (RF) circuits, power amplifiers, motor drivers, and other applications where fast detection of load resistance changes or open circuit conditions can protect sensitive components from damage.

Embodiments of the disclosure provide circuits and techniques for detecting faults in hard disk drive write head resistance. A fault detection circuit monitors differential voltage signals from an H-bridge writer output and compares them to programmable threshold voltages. The threshold voltages are generated using a current mirror architecture that scales with both the write current amplitude and programmable termination impedance values.

In an embodiment, the fault detection circuit includes a current digital-to-analog converter ($I_{DAC}$) that generates mirror currents proportional to the write output current ($I_{OUT}$). A programmable current mirror, with ratios defined by selectable termination resistance and fault threshold resistance values, can process the current from the current digital-to-analog converter ($I_{DAC}$) to create reference signals. The mirrored currents flow through resistors to establish threshold voltages for comparison with the writer output signals. High-speed bipolar transistors in the signal path can enable fault detection within three nanoseconds.

In embodiments, the current mirror implementation incorporates switches to program the termination impedance values and the resistance threshold for fault detection. An alpha scaling factor can maintain consistent proportionality between the writer current, impedance values, and threshold settings across the operating range. The architecture accommodates write currents from several milliamperes to over 100 milliamperes while supporting various termination impedance selections between 30 and 45 ohms.

The fault detection operates independently of which H-bridge diagonal carries current, providing continuous monitoring during write operations. Input buffering with bipolar transistors can isolate the detection circuit from large voltage swings at the writer outputs while maintaining a high-speed response. The architecture is scalable across different write current levels and impedance settings while maintaining accurate threshold detection. These and additional details are further discussed below.

FIG. 1 illustrates a schematic of a writer driver system 100 implemented in a hard disk drive (HDD) preamplifier system. The writer driver system 100 includes a full bridge configuration with a first branch and a second branch that provides bidirectional write currents. The first branch includes a first p-channel transistor ($Q_{P1}$) 102, a first PNP transistor ($Q_{PNP1}$) 106, a first NPN transistor ($Q_{NPN1}$) 110, and a first n-channel transistor ($Q_{N1}$) 114. The second branch includes a second p-channel transistor ($Q_{P2}$) 104, a second PNP transistor ($Q_{PNP2}$) 108, a second NPN transistor ($Q_{NPN2}$) 112, and a second n-channel transistor ($Q_{N2}$) 116.

The writer driver system 100 implements an NPN-PNP H-bridge configuration where each branch includes complementary bipolar transistors. In the first branch, the first PNP transistor ($Q_{PNP1}$) 106 couples between the first p-channel transistor ($Q_{P1}$) 102 and the first NPN transistor ($Q_{NPN1}$) 110, which in turn couples to the first n-channel transistor ($Q_{N1}$) 114. Similarly, in the second branch, the second PNP transistor ($Q_{PNP2}$) 108 couples between the second p-channel transistor ($Q_{P2}$) 104 and the second NPN transistor ($Q_{NPN2}$) 112, which couples to the second n-channel transistor ($Q_{N2}$) 116. The H-bridge configuration enables bidirectional current flow through the magnetic recording head 122 by activating diagonal pairs of transistors.

The bridge circuit provides the write output current ($I_{OUT}$) through an impedance matching network ($Z_{OUT}$) 117 to a transmission line (not shown). In embodiments, the impedance matching network ($Z_{OUT}$) 117 is a configurable matching network that can be adjusted based on the impedance observed at the first node ($WR_{OUTM}$) and the second node ($WR_{OUTP}$) of the writer driver system 100. In embodiments, the impedance matching network ($Z_{OUT}$) 117 includes a first resistor ($R_1$) 118 and a second resistor ($R_2$) 120 that match the characteristic impedance of a transmission line coupling the bridge circuit to the magnetic recording head 122 (e.g., formed by a resistor and a coil). In embodiments, parasitic capacitances (not shown) can exist at the interface between the bridge circuit and the transmission line.

The first node ($WR_{OUTM}$) is a common node between the first PNP transistor ($Q_{PNP1}$) 106, the first NPN transistor ($Q_{NPN1}$) 110, and the impedance matching network ($Z_{OUT}$) 117. The second node ($WR_{OUTP}$) is a common node between the second PNP transistor ($Q_{PNP2}$) 108, the second NPN transistor ($Q_{NPN2}$) 112, and the impedance matching network ($Z_{OUT}$) 117.

In various embodiments, the impedance matching considerations are similar to RF matching techniques but with the distinction of requiring broadband matching across a wide frequency range from DC to several gigahertz. Unlike narrow-band RF applications, the writer driver system operates over a complete bandwidth to support the fast current transitions required for high-speed data writing.

The writer driver system 100 provides precisely controlled bidirectional write currents to the magnetic recording head 122 for writing data onto a magnetic storage medium. The H-bridge configuration enables switching of current direction through the magnetic recording head 122 by alternately activating diagonal pairs of transistors in the first and second branches.

When transistors in one diagonal pair activate, current flows through the magnetic recording head 122 in a first direction to generate a magnetic field of a first polarity. When transistors in the opposite diagonal pair activate, current flows through the magnetic recording head 122 in the opposite direction to generate a magnetic field of opposite polarity.

The bridge circuit switches current flow through diagonal pairs of transistors to generate bidirectional write currents through the magnetic recording head 122. The alternating magnetic fields create different magnetic orientations on the storage medium, thereby encoding binary data. The impedance matching network ($Z_{OUT}$) 117 ensures proper signal transmission through the transmission line by matching the bridge circuit output impedance to the transmission line's characteristic impedance while minimizing signal reflections that could distort the write current waveform at the magnetic recording head 122.

The head fault detection circuit 118 monitors the writer driver system 100 for abnormal head resistance conditions at the magnetic recording head 122—the DC portion of the magnetic recording head 122 resistance. In response to detecting the fault condition, the head fault detection circuit 118 triggers a corresponding fault signal ($HD_{FAULT}$).

During normal operation, the magnetic recording head 122 can exhibit a resistance value from 5 to 15 ohms, which can vary due to, for example, aging or manufacturing variations. In embodiments, the magnetic recording head 122 can have a resistance of 8 ohms. In embodiments, the head fault detection circuit 118 is configured to identify a fault condition when the head resistance exceeds around 30 ohms. In embodiments, the head resistance fault threshold ($R_{FLT}$) value is 30 ohms. In embodiments, the head resistance fault threshold ($R_{FLT}$) can be set to a value between 25 and 50 ohms.

The writer driver system 100 combines CMOS drivers (i.e., the first p-channel transistor ($Q_{P1}$) 102, the first n-channel transistor ($Q_{N1}$) 114, the second p-channel transistor ($Q_{P2}$) 104, and the second n-channel transistor ($Q_{N2}$) 116) with the NPN-PNP H-bridge configuration (i.e., the first PNP transistor ($Q_{PNP1}$) 106, the first NPN transistor ($Q_{NPN1}$) 110, the second PNP transistor ($Q_{PNP2}$) 108, and the second NPN transistor ($Q_{NPN2}$) 112) to provide precise current control. The CMOS drivers establish the overall current levels, while the bipolar transistors in the H-bridge enable fast switching between diagonal pairs. This architecture can support a wide range of output currents while maintaining accurate impedance matching through the configurable impedance matching network ($Z_{OUT}$) 117.

In embodiments, during normal operation, the write output current ($I_{OUT}$) through the magnetic recording head 122 can range from a few milliamperes to 105 mA. In embodiments, the impedance matching network ($Z_{OUT}$) can be a configurable matching network that can be programmed to different levels, such as 30, 35, 40, and 45 ohms—other values may be implemented based on the write output current ($I_{OUT}$).

The head fault detection circuit 118 can operate continuously during write operations, monitoring diagonal current paths through the H-bridge. When one diagonal pair (e.g., the first or second branches) conducts, the detection circuit monitors the head resistance through the first node ($WR_{OUTM}$) and the second node ($WR_{OUTP}$). When the opposite diagonal pair (e.g., the second or first branches) conducts, the detection circuit maintains its monitoring capability. This ensures uninterrupted fault detection through the magnetic recording head 122 regardless of the current direction.

It is advantageous to have a detection speed of less than 3 nanoseconds from fault condition to the generation of the fault signal ($HD_{FAULT}$) by the head fault detection circuit 118, regardless of which branch of the H-bridge is active. The rapid detection of the fault condition can protect the writer driver system 100 components from potential damage due to abnormal head resistance conditions.

Figure 2:
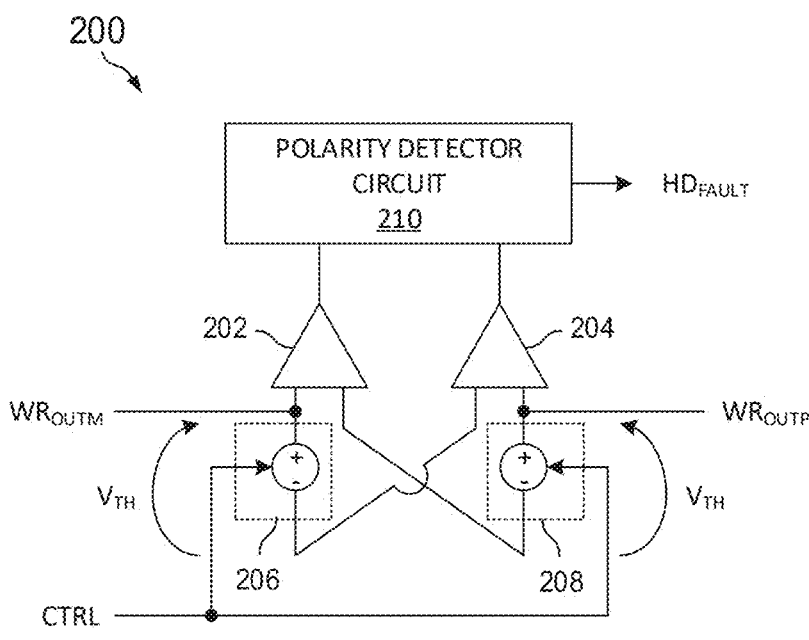
FIGS. 2-6 are schematics of fault detection circuits.

FIG. 2 illustrates a schematic of a fault detection circuit 200 that can be implemented as the head fault detection circuit 118 of FIG. 1. The fault detection circuit 200 includes a first comparator 202, a second comparator 204, a first voltage source 206, a second voltage source 208, and a polarity detector circuit 210, which may (or may not) be arranged as shown. The fault detection circuit 200 may include additional components not shown, such as a controller and memory.

In embodiments, the first voltage source 206 and second voltage source 208 are identical in structure and function. In embodiments, the first voltage source 206 and second voltage source 208 generate identical threshold voltages ($V_{TH}$) for comparison with the bridge output voltages. The threshold voltage ($V_{TH}$) generated by each voltage source is determined by the product of the write output current ($I_{OUT}$) and the parallel combination of the impedance matching network ($Z_{OUT}$) 117 and the head resistance fault threshold ($R_{FLT}$). This relationship can be expressed as $V_{TH}=I_{OUT}\times(Z_{OUT}||R_{FLT})$, where $||$ denotes the parallel combination of impedances.

The head resistance fault threshold ($R_{FLT}$) represents a resistance value that indicates abnormal head operation. During normal operation, the magnetic recording head 122 exhibits a typical resistance of approximately 8 ohms. Manufacturing variations, temperature effects, and normal aging can cause slight variations in this nominal resistance value while maintaining proper head functionality.

In embodiments, a head resistance exceeding 30 ohm indicates a potential fault condition that requires immediate detection and protective action. The difference between normal head resistance and the head resistance fault threshold ($R_{FLT}$) can provide a margin for normal variations while ensuring reliable fault detection. In embodiments, the fault threshold can be programmed through the current mirror ratio settings to accommodate different head designs or system requirements.

The parallel combination of the head resistance fault threshold ($R_{FLT}$) and the selected impedance matching network ($Z_{OUT}$) 117 determines the voltage threshold used for fault detection. As the impedance matching network ($Z_{OUT}$) 117 can be programmed between 30 and 45 ohms, the parallel combination with the 30 ohms for the head resistance fault threshold ($R_{FLT}$) creates different effective threshold values. The current mirror architecture can scale these thresholds across the full range of write currents and the impedance matching network ($Z_{OUT}$) 117 settings.

The head resistance fault threshold ($R_{FLT}$) selection balances competing requirements—it is set high enough above normal head resistance to prevent false fault detection yet low enough to enable rapid identification of genuine fault conditions. In the example where the typical head resistance is 8 ohms, a 30 ohm value for the head resistance fault threshold ($R_{FLT}$) provides approximately 3.75 times margin while enabling fault detection within a 3 nanosecond window.

The first comparator 202 monitors the voltage at the first node ($WR_{OUTM}$) by comparing it with the voltage at the second node ($WR_{OUTP}$) minus the threshold voltages ($V_{TH}$) generated by the first voltage source 206. Similarly, the second comparator 204 monitors the voltage at the second node ($WR_{OUTP}$) by comparing it with the voltage at the first node ($WR_{OUTM}$) minus the threshold voltage ($V_{TH}$) generated by the second voltage source 208.

When either of the differential signals (i.e., the voltages at the first and second nodes) exceed the threshold voltages ($V_{TH}$), the polarity detector circuit 210 triggers the output signal ($HD_{FAULT}$), indicating that a fault condition is detected. In embodiments, the output signal ($HD_{FAULT}$) is logic high in response to detecting a fault condition and logic low in response to a normal operating condition.

The first comparator 202, the second comparator 204, and the polarity detector circuit 210 are configured with high-speed components to perform voltage comparisons within ins. This rapid comparison capability enables the fault detection circuit 200 to identify abnormal head resistance conditions within the system timing requirements. The symmetrical arrangement of voltage sources and comparators ensures consistent fault detection through the magnetic recording head regardless of the current direction.

The high-speed signals at the first node ($WR_{OUTM}$) and the second node ($WR_{OUTP}$) can load down or disturb the measured signals. For example, if the comparator input resistance is too low, it can draw significant current from the H-bridge outputs, affecting the voltage levels and potentially distorting the measurements. Accordingly, the first comparator 202 and the second comparator 204 can incorporate input resistance characteristics that prevent loading effects on the bridge output signals.

In embodiments, the first comparator 202 and the second comparator 204 are configured with sufficiently high input resistance to minimize their impact on the bridge output signals. The high input resistance ensures that the comparators act as near-ideal voltage monitors, drawing negligible current from the first node ($WR_{OUTM}$) and the second node ($WR_{OUTP}$). By preventing loading effects, the comparators can maintain accurate voltage measurements without disturbing the normal operation of the write driver system.

Accounting for the loading can become advantageous given the high-speed switching nature of the H-bridge outputs and the need for accurate fault detection within 3 nanoseconds. Any significant loading at the first node ($WR_{OUTM}$) and the second node ($WR_{OUTP}$) can slow down switching transitions or create voltage drops that might interfere with proper fault detection.

While the first comparator 202, the second comparator 204, and the polarity detector circuit 210 represent conventional high-speed comparison techniques, their specific implementation in the fault detection circuit 200 enables the overall head resistance monitoring functionality.

The first voltage source 206 and the second voltage source 208 are configured to track the write output current ($I_{OUT}$) across its entire operating range from, for example, a few milliamperes to 105 mA. Similarly, the threshold voltage ($V_{TH}$) can be automatically adjusted through the control signal (CTRL) when the impedance matching network ($Z_{OUT}$) 117 is programmed to different values, such as between 30 and 45 ohms. The adaptive threshold generation ensures accurate fault detection across all operating conditions. In embodiments, the control signal (CTRL) is generated by a controller.

The proposed architectural approach eliminates the latency typically associated with resistance measurement and calculation in conventional solutions for identifying abnormal head resistance conditions. While traditional solutions typically measure or calculate head resistance values directly, the embodiment architecture disclosed in FIG. 1 uses pre-generated threshold voltages that enable immediate comparison with the bridge output signals.

Advantageously, the threshold voltage generation enables high-speed fault detection. Consequently, rather than waiting for resistance measurements, the circuit can generate reference voltages that track with write current changes through, for example, a current mirror architecture. As the threshold voltages can automatically scale with the write current amplitude and programmable termination impedance values, accurate detection levels across all operating conditions can be maintained.

By having the threshold voltages continuously available and adequately scaled, the comparison operation reduces to a simple voltage check that can be completed within 3 nanoseconds. When bridge output voltages exceed their respective thresholds, the fault condition is immediately detected without additional processing delays.

Figure 3:
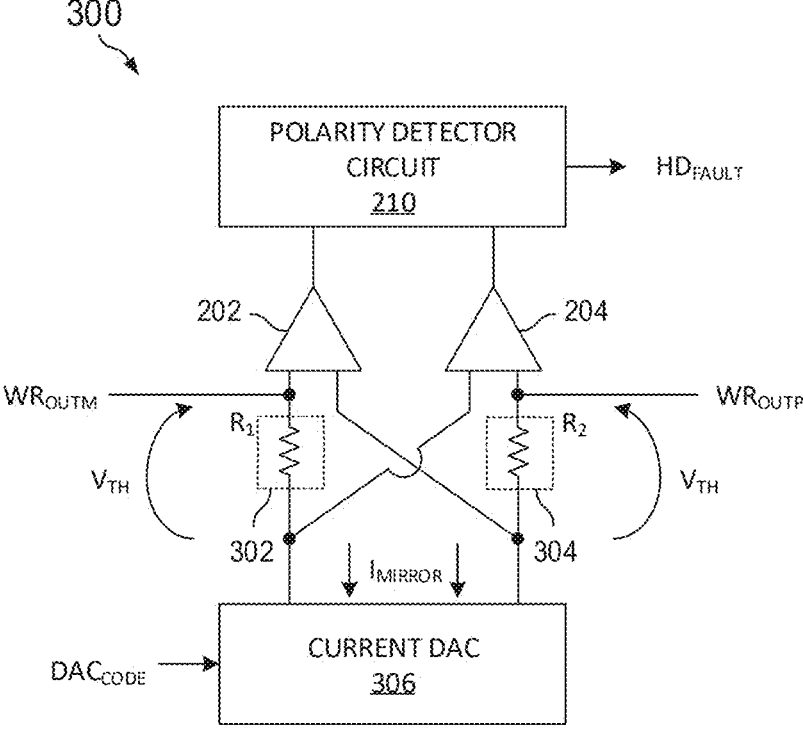

FIG. 3 illustrates a schematic of a fault detection circuit 300 that can be implemented as the head fault detection circuit 118 of FIG. 1. The fault detection circuit 300 includes the first comparator 202, the second comparator 204, a first resistor ($R_1$) 302, a second resistor ($R_2$) 304, a current digital-to-analog converter ($I_{DAC}$) 306, and the polarity detector circuit 210, which may (or may not) be arranged as shown. The fault detection circuit 300 may include additional components not shown, such as a controller and memory.

The fault detection circuit 300 continuously monitors the output of the writer driver system 100 at the first node ($WR_{OUTM}$) and the second node ($WR_{OUTP}$) for head resistance faults. The polarity detector circuit 210 receives inputs from each comparator based on which diagonal pair of the H-bridge is active. The polarity detector circuit 210 generates an output signal ($HD_{FAULT}$) indicating whether a fault condition is detected if any of the voltages at the first node ($WR_{OUTM}$) or the second node ($WR_{OUTP}$) exceed the threshold voltages ($V_{TH}$).

In embodiments, the current digital-to-analog converter ($I_{DAC}$) 306 receives a digital control word ($DAC_{CODE}$) that sets the current ($I_{MIRROR}$) based on the current operating conditions. The value of the digital control word ($DAC_{CODE}$) can incorporate information about the write output current ($I_{OUT}$), the selected impedance matching network ($Z_{OUT}$), and the head resistance fault threshold ($R_{FLT}$). In embodiments, the digital control word ($DAC_{CODE}$) is generated by a controller.

The current digital-to-analog converter ($I_{DAC}$) 306 generates two identical currents ($I_{MIRROR}$) that flow through the first resistor ($R_1$) 302 and the second resistor ($R_2$) 304. The current ($I_{MIRROR}$) flowing through the resistors generates the threshold voltages ($V_{TH}$) for fault detection at the inputs of the first comparator 202 and the second comparator 204.

As the write output current ($I_{OUT}$) changes during normal operation, the digital control word ($DAC_{CODE}$) can be updated to maintain threshold scaling. Similarly, when the impedance matching network ($Z_{OUT}$) is programmed to different values, the digital control word ($DAC_{CODE}$) can be adjusted to preserve fault detection thresholds.

The first comparator 202 monitors the voltage at the first node ($WR_{OUTM}$) against the threshold voltage ($V_{TH}$) generated across the first resistor ($R_1$) 302, while the second comparator 204 monitors the second node ($WR_{OUTP}$) against the threshold voltage ($V_{TH}$) across the second resistor ($R_2$) 304. When either bridge output voltage exceeds the set threshold, indicating a potential head resistance fault, the corresponding comparator signals the polarity detector circuit 210.

The polarity detector circuit 210 processes the comparator outputs to determine which H-bridge diagonal pair is active and whether a fault condition exists. Using identical mirror currents and matched resistors, the circuit can maintain symmetrical fault detection capability through the magnetic recording head regardless of current direction.

The matched resistors (i.e., the first resistor ($R_1$) 302 and the second resistor ($R_2$) 304) serve dual purposes-they convert the current ($I_{MIRROR}$) into threshold voltages ($V_{TH}$) and provide proper loading characteristics for the current digital-to-analog converter ($I_{DAC}$) 306. The resistance values can be selected to generate appropriate threshold voltage levels while maintaining accurate, current mirror operation across the full range of operating conditions.

The current ($I_{MIRROR}$) can be determined by the product of the write output current ($I_{OUT}$), the parallel combination of the impedance matching network ($Z_{OUT}$) and the head resistance fault threshold ($R_{FLT}$), and the reciprocal of the resistor values. This relationship can be expressed as:

$$I_{MIRROR} = \frac{I_{OUT} \times (Z_{OUT} \| R_{FLT})}{R},$$

where $R = R_1 = R_2$.

The current digital-to-analog converter ($I_{DAC}$) 306 is controlled to account for the actual value of the write output current ($I_{OUT}$) and the parallel combination of the impedance matching network ($Z_{OUT}$) and the head resistance fault threshold ($R_{FLT}$). As the write output current ($I_{OUT}$) varies during normal operation, the current digital-to-analog converter ($I_{DAC}$) 306 adjusts its output current accordingly to maintain the proper scaling of current ($I_{MIRROR}$). Similarly, when the impedance matching network ($Z_{OUT}$) is programmed to different values or if the head resistance fault threshold ($R_{FLT}$) is adjusted, the current digital-to-analog converter ($I_{DAC}$) 306 adapts its output to ensure accurate threshold voltage generation.

The resolution of the current digital-to-analog converter ($I_{DAC}$) 306 can be determined by the granularity for selecting the values of the write output current ($I_{OUT}$), the impedance matching network ($Z_{OUT}$), and the head resistance fault threshold ($R_{FLT}$). Higher resolution allows finer control over the threshold voltages but may increase circuit complexity. The appropriate resolution can be chosen based on the system's specific operating ranges and desired fault detection accuracy.

Figure 4:
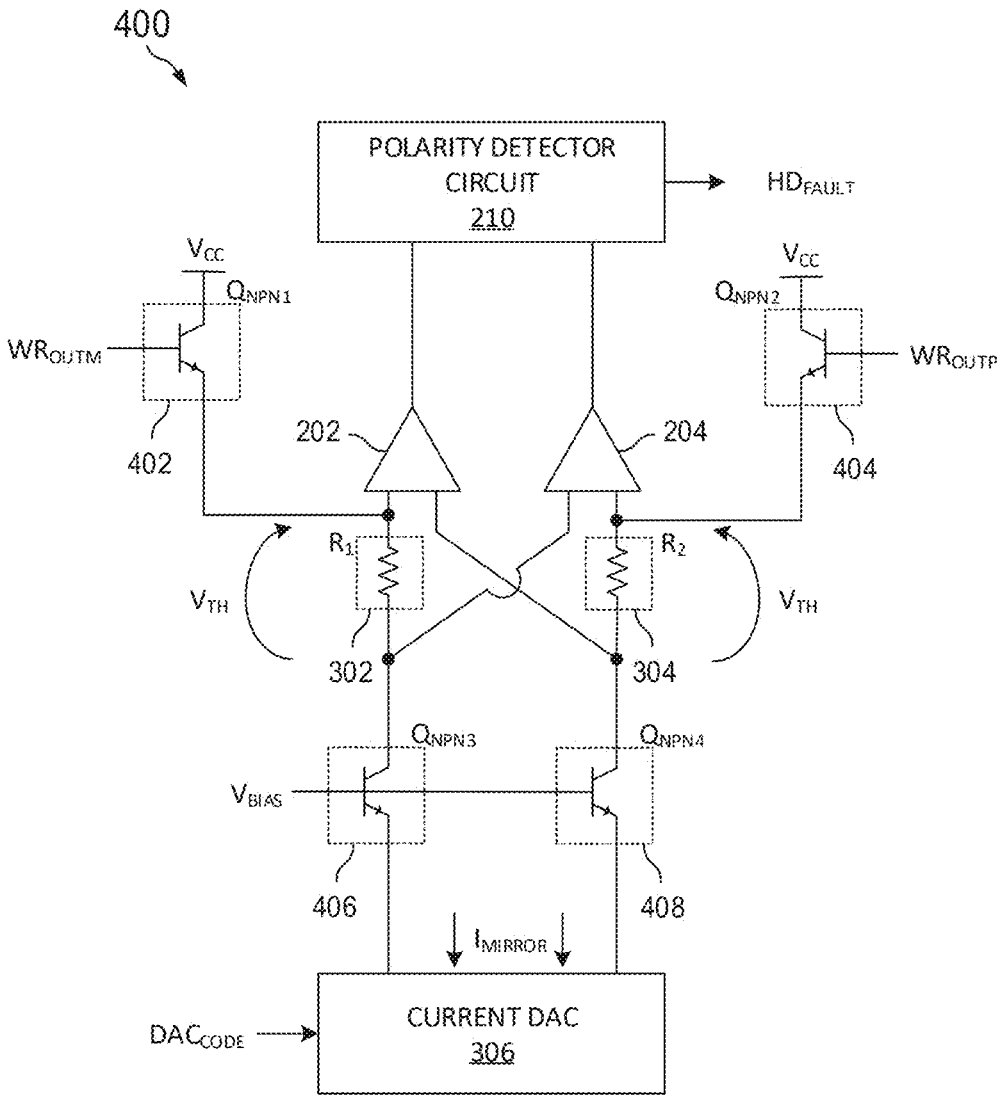

FIG. 4 illustrates a schematic of a fault detection circuit 400 that can be implemented as the head fault detection circuit 118 of FIG. 1. The fault detection circuit 400 includes the first comparator 202, the second comparator 204, the first resistor ($R_1$) 302, the second resistor ($R_2$) 304, the current digital-to-analog converter ($I_{DAC}$) 306, the polarity detector circuit 210, a first NPN transistor ($Q_{NPN1}$) 402, a second NPN transistor ($Q_{NPN2}$) 404, a third NPN transistor ($Q_{NPN3}$) 406, and a fourth NPN transistor ($Q_{NPN4}$) 408, which may (or may not) be arranged as shown. The fault detection circuit 400 may include additional components not shown, such as a controller and memory.

The fault detection circuit 400 is similar to the fault detection circuit 300; however, the fault detection circuit 400 additionally incorporates the first NPN transistor ($Q_{NPN1}$) 402, the second NPN transistor ($Q_{NPN2}$) 404, the third NPN transistor ($Q_{NPN3}$) 406, and the fourth NPN transistor ($Q_{NPN4}$) 408 as current steering devices.

The bipolar transistor implementation in the fault detection circuit 400 provides high-speed operation while maintaining signal integrity throughout the detection path. The combination of input buffers and current steering transistors enables accurate threshold voltage generation and comparison while protecting the current digital-to-analog converter ($I_{DAC}$) 306 from potentially disruptive voltage variations at the bridge outputs.

The first NPN transistor ($Q_{NPN1}$) 402 and the second NPN transistor ($Q_{NPN2}$) 404 buffer the bridge output signals at the first node ($WR_{OUTM}$) and the second node ($WR_{OUTP}$), respectively. These input buffers isolate the fault detection circuit 400 from the large voltage swings at the H-bridge outputs while maintaining the high-speed response characteristics for rapid fault detection. The collector terminals of the first NPN transistor ($Q_{NPN1}$) 402 and the second NPN transistor ($Q_{NPN2}$) 404 are coupled to the supply voltage ($V_{CC}$). The emitter terminals of the first NPN transistor ($Q_{NPN1}$) 402 and the second NPN transistor ($Q_{NPN2}$) 404 are coupled to the inputs of the first comparator 202 and the second comparator 204.

The third NPN transistor ($Q_{NPN3}$) 406 and the fourth NPN transistor ($Q_{NPN4}$) 408 steer the mirror currents ($I_{MIRROR}$) generated by the current digital-to-analog converter ($I_{DAC}$) 306 through the first resistor ($R_1$) 302 and the second resistor ($R_2$) 304. A bias voltage (VBIAS) controls these transistors to maintain proper current flow while isolating the current digital-to-analog converter ($I_{DAC}$) 306 from voltage variations at the comparator inputs. This configuration prevents the current digital-to-analog converter ($I_{DAC}$) 306 from experiencing the large voltage swings at the bridge outputs. The polarity detector circuit 210 generates an output signal ($HD_{FAULT}$) indicating whether a fault condition is detected.

The current digital-to-analog converter ($I_{DAC}$) 306 receives a digital control word ($DAC_{CODE}$) input that controls the mirror current generation based on the write output current ($I_{OUT}$) and the parallel combination of the impedance matching network ($Z_{OUT}$) and the head resistance fault threshold ($R_{FLT}$). The currents ($I_{MIRROR}$) flow through the first resistor ($R_1$) 302 and the second resistor ($R_2$) 304 to generate the threshold voltages ($V_{TH}$) used by the first comparator 202 and the second comparator for fault detection. The steering transistors (i.e., the third NPN transistor ($Q_{NPN3}$) 406 and the fourth NPN transistor ($Q_{NPN4}$) 408) ensure stable current flow while minimizing the effects of parasitic capacitances.

Figure 5:
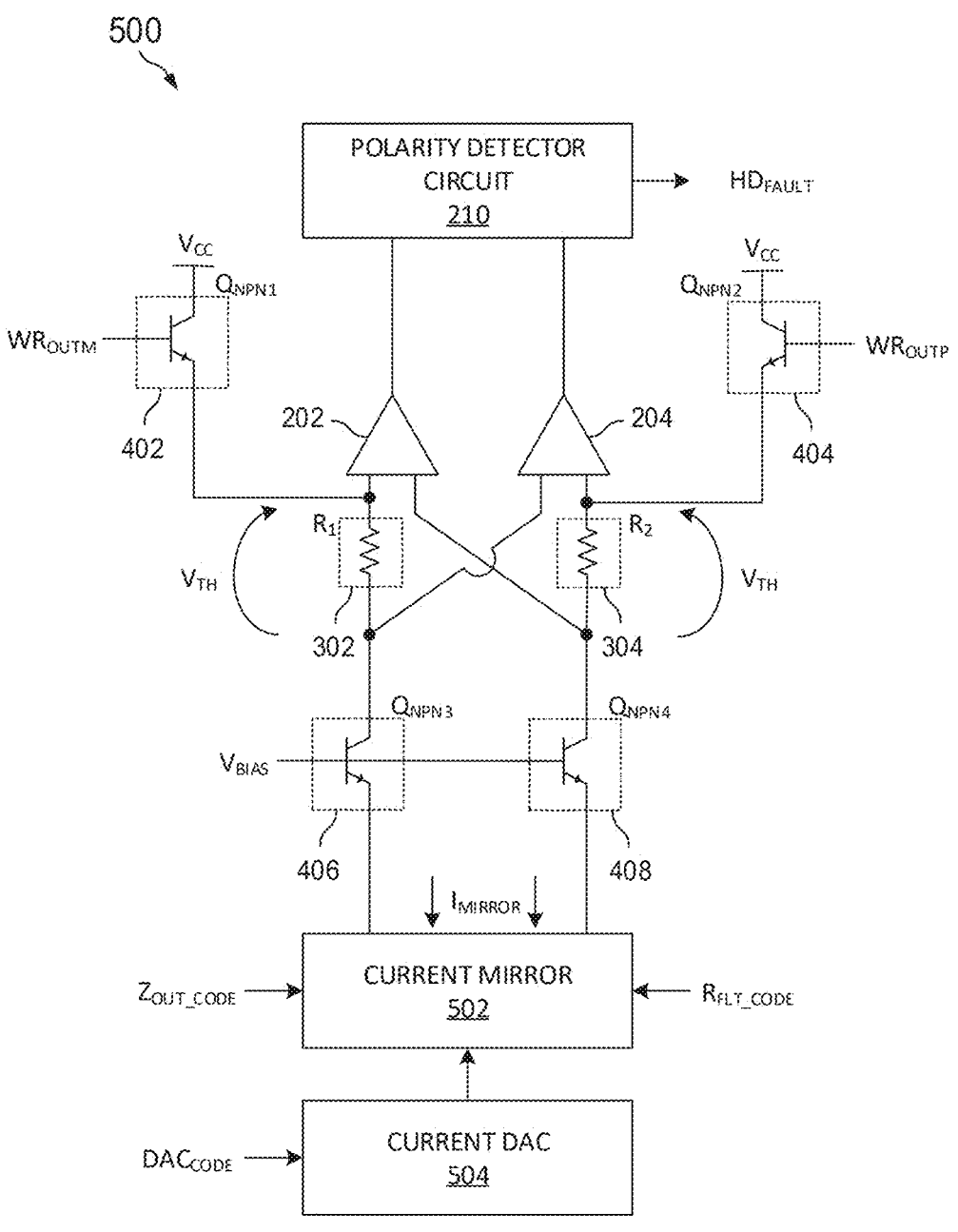

FIG. 5 illustrates a schematic of a fault detection circuit 500 that can be implemented as the head fault detection circuit 118 of FIG. 1. The fault detection circuit 500 includes the first comparator 202, the second comparator 204, the first resistor ($R_1$) 302, the second resistor ($R_2$) 304, the polarity detector circuit 210, the first NPN transistor ($Q_{NPN1}$) 402, the second NPN transistor ($Q_{NPN2}$) 404, the third NPN transistor ($Q_{NPN3}$) 406, the fourth NPN transistor ($Q_{NPN4}$) 408, a current mirror 502, and a current digital-to-analog converter ($I_{DAC}$) 504, which may (or may not) be arranged as shown. The fault detection circuit 500 may include additional components not shown, such as a controller and memory.

The circuit architecture builds upon the configuration shown in FIG. 4 by introducing separate programmability for the impedance matching network and fault threshold settings. The fault detection circuit 500 is similar to the fault detection circuit 400; however, in the fault detection circuit 500, the current digital-to-analog converter ($I_{DAC}$) 306 is replaced with the current mirror 502 and the current digital-to-analog converter ($I_{DAC}$) 504.

The current mirror 502 receives two control inputs: the impedance matching digital control word ($Z_{OUT\_CODE}$) and the head resistance fault threshold control word ($R_{FLT\_CODE}$), which set the mirror ratio based on the selected impedance matching network ($Z_{OUT}$) and the head resistance fault threshold ($R_{FLT}$), respectively. In embodiments, the impedance matching digital control word ($Z_{OUT\_CODE}$) and the head resistance fault threshold control word ($R_{FLT\_CODE}$) are generated by a controller.

The current digital-to-analog converter ($I_{DAC}$) 504 generates a reference current proportional to the write output current ($I_{OUT}$). The current mirror 502 scales the reference current from the current digital-to-analog converter ($I_{DAC}$) 504 according to the programmed values of the impedance matching network ($Z_{OUT}$) and the head resistance fault threshold ($R_{FLT}$) to generate the currents ($I_{MIRROR}$). The polarity detector circuit 210 generates an output signal ($HD_{FAULT}$) indicating whether a fault condition is detected. In embodiments, the current digital-to-analog converter ($I_{DAC}$) 504 is a linear current digital-to-analog converter. The current generated by the current digital-to-analog converter ($I_{DAC}$) 504 is set based on the value of the digital control word ($DAC_{CODE}$).

Advantageously, separating the current generation into two stages—the current digital-to-analog converter ($I_{DAC}$) 504 for write current scaling and the current mirror 502 for impedance scaling-provides independent control over each parameter. This architecture allows the fault detection thresholds to adapt automatically when the write current changes or the value of the impedance matching network is modified.

The NPN transistors maintain their respective roles from the previous implementation, with the first NPN transistor ($Q_{NPN1}$) 402 and the second NPN transistor ($Q_{NPN2}$) 404 serving as input buffers, while the third NPN transistor ($Q_{NPN3}$) 406 and the fourth NPN transistor ($Q_{NPN4}$) 408 steer the mirror currents through the first resistor ($R_1$) 302 and the second resistor ($R_2$) 304. The bias voltage (VBIAS) ensures proper operation of the current steering transistors while isolating the current mirror 502 from voltage variations at the comparator inputs.

Figure 6:
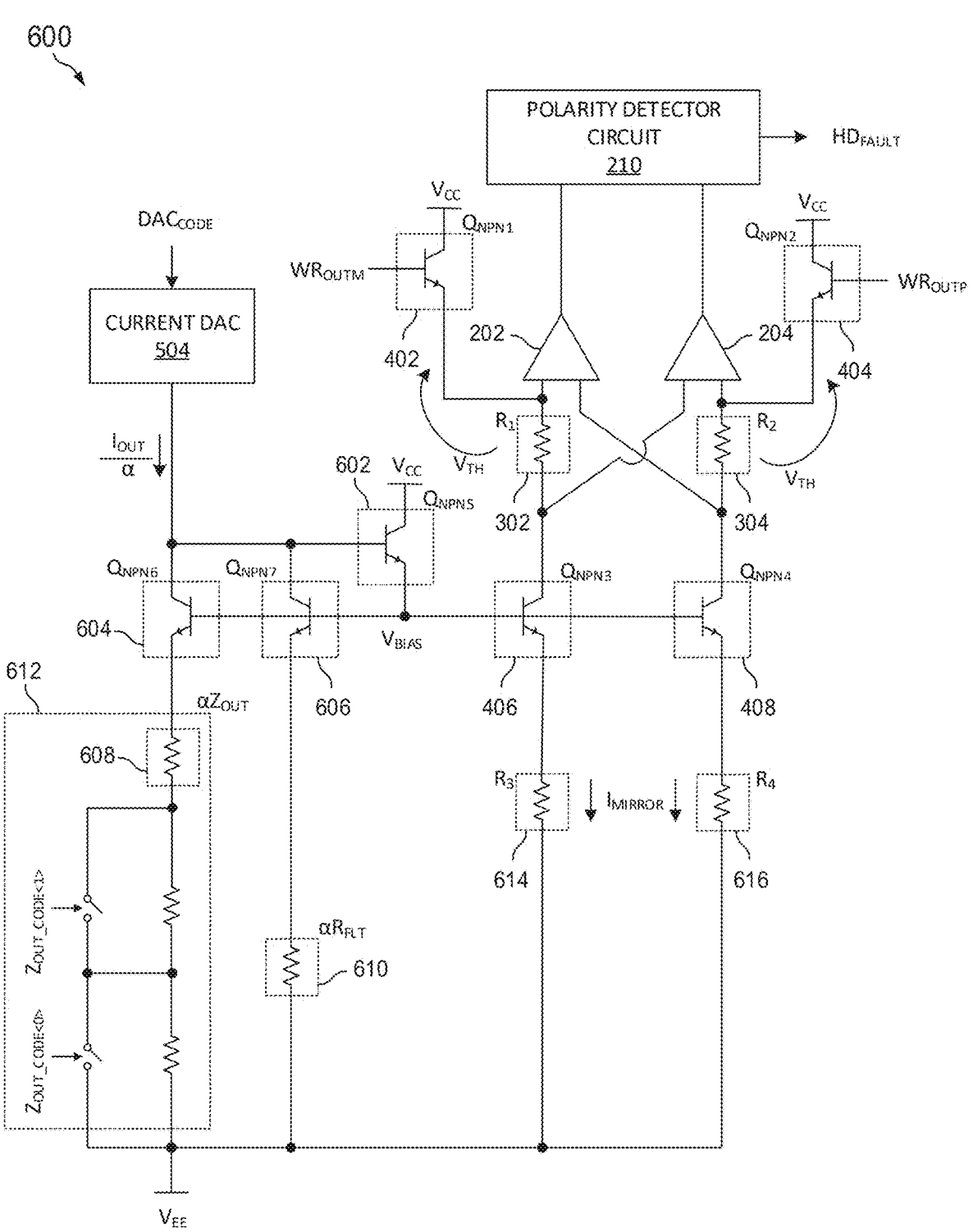

FIG. 6 illustrates a schematic of a fault detection circuit 600 that can be implemented as the head fault detection circuit 118 of FIG. 1. The fault detection circuit 600 implements a current mirror architecture with programmable impedance scaling.

The fault detection circuit 600 includes the first comparator 202, the second comparator 204, the first resistor ($R_1$) 302, the second resistor ($R_2$) 304, the polarity detector circuit 210, the first NPN transistor ($Q_{NPN1}$) 402, the second NPN transistor ($Q_{NPN2}$) 404, the third NPN transistor ($Q_{NPN3}$) 406, the fourth NPN transistor ($Q_{NPN4}$) 408, the current digital-to-analog converter ($I_{DAC}$) 504, a fifth NPN transistor ($Q_{NPN5}$) 602, a sixth NPN transistor ($Q_{NPN6}$) 604, a seventh NPN transistor ($Q_{NPN7}$) 606, a multiplied replica of the impedance matching network ($\alpha Z_{OUT}$) 608, a multiplied replica of the head resistance fault threshold ($\alpha R_{FLT}$) 610, a third resistor ($R_3$) 614, and a fourth resistor ($R_4$) 616, which may (or may not) be arranged as shown. The fault detection circuit 600 may include additional components not shown, such as a controller and memory.

The current digital-to-analog converter ($I_{DAC}$) 504 generates a current ($\alpha I_{OUT}$) proportional to the write output current ($I_{OUT}$) by a scaling factor of alpha ($\alpha$). This current feeds into the bipolar current mirror network formed by the fifth NPN transistor ($Q_{NPN5}$) 602, the sixth NPN transistor ($Q_{NPN6}$) 604, and the seventh NPN transistor ($Q_{NPN7}$) 606. The current mirror network incorporates two programmable elements: the multiplied replica of the impedance matching network ($\alpha Z_{OUT}$) 608 and the multiplied replica of the head resistance fault threshold ($\alpha R_{FLT}$) 610.

The scaled replica architecture maintains consistent proportionality between all current paths through the scaling factor alpha ($\alpha$). This approach ensures accurate threshold generation across the full range of write currents and impedance settings while leveraging the speed advantages of bipolar transistors.

The impedance matching network ($\alpha Z_{OUT}$) 608 includes switches and resistors that can be programmed through the impedance matching digital control word ($Z_{OUT\_CODE}$) to have an impedance that matches the selected impedance matching network ($Z_{OUT}$) value, scaled by the factor alpha ($\alpha$). It should be appreciated that although two switches and two resistors are shown for the impedance matching network ($\alpha Z_{OUT}$) 608, a greater number of switches and resistors are contemplated in other embodiments. Similarly, the head resistance fault threshold ($\alpha R_{FLT}$) 610 represents the desired head resistance fault threshold ($R_{FLT}$) resistance value, also scaled by the factor alpha ($\alpha$).

The parallel combination of the replica circuits determines the adjustable mirror ratio that generates the currents ($I_{MIRROR}$) through the third resistor ($R_3$) 614 and the fourth resistor ($R_4$) 616. In embodiments, the resistance values of the first resistor ($R_1$) 302, the second resistor ($R_2$) 304, the third resistor ($R_3$) 614, and the fourth resistor ($R_4$) 616 are equal to each other.

The high-frequency transition and current gain characteristics of the NPN bipolar transistors enable rapid current steering and precise mirror ratios. The third NPN transistor ($Q_{NPN3}$) 406 and the fourth NPN transistor ($Q_{NPN4}$) 408 steer the mirror currents through the first resistor ($R_1$) 302 and the second resistor ($R_2$) 304 to generate the threshold voltages ($V_{TH}$), while maintaining isolation through the bias voltage (VBIAS). The combination of high-performance bipolar devices and precise current scaling enables fault detection within, for example, two nanoseconds. The polarity detector circuit 210 generates an output signal ($HD_{FAULT}$) indicating whether a fault condition is detected.

Figure 7:
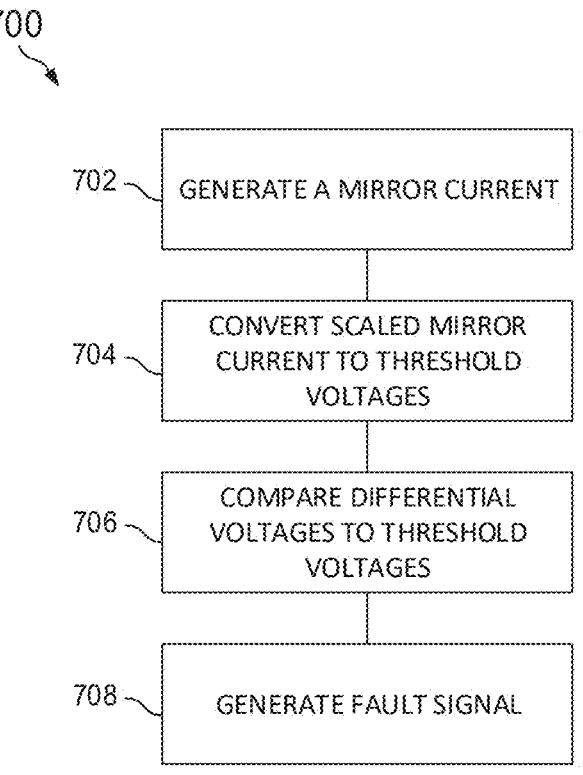
FIG. 7 is a flowchart of an embodiment method for operating a fault detection circuit.

FIG. 7 illustrates a flowchart of an embodiment method 700 for operating the fault detection circuit 118. It is noted that all steps outlined in the method are not necessarily required and can be optional. Further, changes to the arrangement of the steps, removal of one or more steps and path connections, and addition of steps and path connections are similarly contemplated.

At step 702, the fault detection circuit generates a mirror current proportional to the write output current through the magnetic recording head. The mirror current generation can use a current digital-to-analog converter to create a scaled version of the write current, followed by processing through a programmable current mirror. In embodiments, the parallel combination of the selected impedance matching network value and head resistance fault threshold determines the current mirror ratio.

At step 704, the scaled mirror current is converted into threshold voltages. This conversion can occur by flowing identical mirror currents through matched resistors. The threshold voltages can automatically track changes in the write current amplitude and adjust when the impedance matching network value is modified. High-speed bipolar transistors can steer the mirror currents through the resistors while maintaining signal integrity.

In embodiments, the scaling of the mirror current involves receiving and processing digital control codes to establish precise current ratios. The current mirror uses the digital codes to adjust its mirror ratio through a network of scaled replica impedances. This programmable architecture can maintain accurate scaling across the full range of write currents while providing flexibility to adapt to different head designs and operating conditions.

A first digital code can program the selectable impedance matching value, allowing the circuit to accommodate different impedance settings, such as between 30 and 45 ohms. A second digital code can set the head resistance fault threshold, typically targeting detection when head resistance exceeds, for example, 30 ohms from its nominal 8 ohm value.

At step 706, the differential voltages from the H-bridge writer outputs are compared to the generated threshold voltages. Input buffer transistors can isolate the detection circuit from large voltage swings at the bridge outputs while maintaining high-speed response characteristics. High-input impedance comparators can perform the voltage comparison without loading the bridge outputs.

At step 708, a fault signal is generated in response to the differential voltages exceeding their respective thresholds. In embodiments, the fault detection occurs within three nanoseconds of a fault condition, regardless of which diagonal pair of the H-bridge is active. The rapid detection enables protection of the writer driver system components from potential damage due to abnormal head resistance conditions.

A first aspect relates to a circuit for detecting a fault in a head resistance of a hard disk drive, the circuit comprising a current digital-to-analog converter configured to generate a scaled current proportional to a write output current, wherein the write output current flows through the head resistance via an H-bridge writer output; a programmable current mirror comprising a first bipolar transistor network coupled to receive the scaled current, a scaled impedance matching network coupled to the first bipolar transistor network, a scaled fault threshold resistance coupled in parallel with the scaled impedance matching network, and a second bipolar transistor network configured to generate mirror currents based on the scaled impedance matching network and scaled fault threshold resistance; a pair of matched resistors coupled to receive the mirror currents and generate threshold voltages; and a comparator circuit configured to compare differential voltages from the H-bridge writer output to the threshold voltages, and generate a fault signal in response to detecting a fault condition.

In a first implementation form of the circuit, according to the first aspect as such, the scaled impedance matching network is programmable based on a first digital control word.

In a second implementation form of the circuit, according to the first aspect as such or any preceding implementation form of the first aspect, the first bipolar transistor network comprises a first transistor having a collector coupled to a supply voltage; and a pair of transistors coupled to receive a bias voltage and steer the scaled current.

In a third implementation form of the circuit, according to the first aspect as such or any preceding implementation form of the first aspect, the second bipolar transistor network comprises a pair of transistors coupled to receive a bias voltage and steer the mirror currents through the pair of matched resistors.

In a fourth implementation form of the circuit, according to the first aspect as such or any preceding implementation form of the first aspect, the comparator circuit comprises input buffer transistors coupled to receive the differential voltages from the H-bridge writer output.

In a fifth implementation form of the circuit, according to the first aspect as such or any preceding implementation form of the first aspect, the comparator circuit further comprises a pair of comparator circuits, wherein the input impedance of the comparator circuits prevents loading effects on the H-bridge writer output.

In a sixth implementation form of the circuit, according to the first aspect as such or any preceding implementation form of the first aspect, the comparator circuit includes a detector circuit comprising a polarity detector configured to maintain fault detection capability regardless of which diagonal pair of transistors in the H-bridge writer output is active.

A second aspect relates to a method of detecting a fault in a head resistance of a hard disk drive, the method comprising generating a mirror current proportional to a write output current, wherein the write output current flows through the head resistance via an H-bridge writer output; converting the mirror current into threshold voltages; comparing differential voltages from the H-bridge writer output to the threshold voltages; and generating a fault signal in response to detecting a fault condition.

In a first implementation form of the method, according to the second aspect as such, generating the mirror current comprises generating a scaled current using a current digital-to-analog converter; and processing the scaled current through a programmable current mirror having a mirror ratio defined by a parallel combination of a scaled impedance matching network and a scaled fault threshold resistance.

In a second implementation form of the method, according to the second aspect as such or any preceding implementation form of the second aspect, the scaled impedance matching network is programmable based on a first digital control word.

In a third implementation form of the method, according to the second aspect as such or any preceding implementation form of the second aspect, converting the mirror current comprises steering the mirror current through matched resistors using bipolar transistors controlled by a bias voltage.

In a fourth implementation form of the method, according to the second aspect as such or any preceding implementation form of the second aspect, comparing the differential voltages comprises buffering the differential voltages using input buffer transistors; and comparing the buffered differential voltages using comparator circuits having high input impedance.

In a fifth implementation form of the method, according to the second aspect as such or any preceding implementation form of the second aspect, generating the fault signal comprises maintaining fault detection capability regardless of which diagonal pair of transistors in the H-bridge writer output is active.

In a sixth implementation form of the method, according to the second aspect as such or any preceding implementation form of the second aspect, the fault condition is detected within three nanoseconds.

In a seventh implementation form of the method, according to the second aspect as such or any preceding implementation form of the second aspect, the write output current ranges from several milliamperes to 105 milliamperes during normal operation of the hard disk drive.

A third aspect relates to a write driver system for a hard disk drive, the write driver system comprising an H-bridge circuit configured to provide a write output current through a head resistance; an impedance matching network coupled between the H-bridge circuit and the head resistance; and a fault detection circuit comprising first and second voltage sources configured to generate threshold voltages based on the write output current and a parallel combination of the impedance matching network and a head resistance fault threshold; first and second comparators configured to compare differential voltages from the H-bridge circuit to the threshold voltages; and a polarity detector configured to generate a fault signal in response to detecting a fault condition.

In a first implementation form of the write driver system, according to the third aspect as such, the H-bridge circuit comprises a first branch including complementary bipolar transistors coupled between supply voltages; and a second branch including complementary bipolar transistors coupled between the supply voltages, wherein diagonal pairs of the transistors are activated to control direction of the write output current.

In a second implementation form of the write driver system, according to the third aspect as such or any preceding implementation form of the third aspect, the first and second comparators have input impedance characteristics that prevent loading effects on the differential voltages from the H-bridge circuit.

In a third implementation form of the write driver system, according to the third aspect as such or any preceding implementation form of the third aspect, the fault detection circuit detects the fault condition within three nanoseconds regardless of which diagonal pair of transistors in the H-bridge circuit is active.

In a fourth implementation form of the write driver system, according to the third aspect as such or any preceding implementation form of the third aspect, the first and second voltage sources comprise a current digital-to-analog converter configured to generate a scaled current proportional to the write output current; a programmable current mirror comprising a first bipolar transistor network coupled to receive the scaled current, a scaled replica of the impedance matching network, a scaled replica of the head resistance fault threshold coupled in parallel with the scaled replica of the impedance matching network, and a second bipolar transistor network configured to generate mirror currents; and matched resistors coupled to receive the mirror currents and generate the threshold voltages.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A circuit for detecting a fault in a head resistance of a hard disk drive, the circuit comprising:
   a current digital-to-analog converter configured to generate a scaled current proportional to a write output current, wherein the write output current flows through the head resistance via an H-bridge writer output;
   a programmable current mirror comprising:
      a first bipolar transistor network coupled to receive the scaled current,
      a scaled impedance matching network coupled to the first bipolar transistor network,
      a scaled fault threshold resistance coupled in parallel with the scaled impedance matching network, and a second bipolar transistor network configured to generate mirror currents based on the scaled impedance matching network and scaled fault threshold resistance;
   a pair of matched resistors coupled to receive the mirror currents and generate threshold voltages; and
   a comparator circuit configured to:
      compare differential voltages from the H-bridge writer output to the threshold voltages, and
      generate a fault signal in response to detecting a fault condition.

2. The circuit of claim 1, wherein the scaled impedance matching network is programmable based on a first digital control word.

3. The circuit of claim 1, wherein the first bipolar transistor network comprises:
   a first transistor having a collector coupled to a supply voltage; and
   a pair of transistors coupled to receive a bias voltage and steer the scaled current.

4. The circuit of claim 1, wherein the second bipolar transistor network comprises a pair of transistors coupled to receive a bias voltage and steer the mirror currents through the pair of matched resistors.

5. The circuit of claim 1, wherein the comparator circuit comprises input buffer transistors coupled to receive the differential voltages from the H-bridge writer output.

6. The circuit of claim 5, wherein the comparator circuit further comprises a pair of comparator circuits, wherein an input impedance of the comparator circuits prevents loading effects on the H-bridge writer output.

7. The circuit of claim 1, wherein the comparator circuit includes a detector circuit comprising a polarity detector configured to maintain fault detection capability regardless of which diagonal pair of transistors in the H-bridge writer output is active.

8. A method of detecting a fault in a head resistance of a hard disk drive, the method comprising:
   generating a mirror current proportional to a write output current, wherein the write output current flows through the head resistance via an H-bridge writer output;
   converting the mirror current into threshold voltages by steering the mirror current through matched resistors using bipolar transistors controlled by a bias voltage;
   comparing differential voltages from the H-bridge writer output to the threshold voltages; and
   generating a fault signal in response to detecting a fault condition.

9. The method of claim 8, wherein generating the mirror current comprises:
   generating a scaled current using a current digital-to-analog converter; and
   processing the scaled current through a programmable current mirror having a mirror ratio defined by a parallel combination of a scaled impedance matching network and a scaled fault threshold resistance.

10. The method of claim 9, wherein the scaled impedance matching network is programmable based on a first digital control word.

11. The method of claim 8, wherein comparing the differential voltages comprises:
   buffering the differential voltages using input buffer transistors; and
   comparing the buffered differential voltages using comparator circuits having high input impedance.

12. The method of claim 8, wherein generating the fault signal comprises maintaining fault detection capability regardless of which diagonal pair of transistors in the H-bridge writer output is active.

13. The method of claim 8, wherein the fault condition is detected within three nanoseconds.

14. The method of claim 8, wherein the write output current ranges from several milliamperes to 105 milliamperes during normal operation of the hard disk drive.

15. A write driver system for a hard disk drive, the write driver system comprising:

an H-bridge circuit configured to provide a write output current through a head resistance;

an impedance matching network coupled between the H-bridge circuit and the head resistance; and a fault detection circuit comprising:

first and second voltage sources configured to generate threshold voltages based on the write output current and a parallel combination of the impedance matching network and a head resistance fault threshold;

first and second comparators configured to compare differential voltages from the H-bridge circuit to the threshold voltages; and a polarity detector configured to generate a fault signal in response to detecting a fault condition.

16. The write driver system of claim 15, wherein the H-bridge circuit comprises:

a first branch including complementary bipolar transistors coupled between supply voltages; and a second branch including complementary bipolar transistors coupled between the supply voltages, wherein diagonal pairs of the transistors are activated to control direction of the write output current.

17. The write driver system of claim 15, wherein the first and second comparators have input impedance characteristics that prevent loading effects on the differential voltages from the H-bridge circuit.

18. The write driver system of claim 15, wherein the fault detection circuit detects the fault condition within three nanoseconds regardless of which diagonal pair of transistors in the H-bridge circuit is active.

19. The write driver system of claim 15, wherein the first and second voltage sources comprise:

a current digital-to-analog converter configured to generate a scaled current proportional to the write output current;

a programmable current mirror comprising:

a first bipolar transistor network coupled to receive the scaled current, a scaled replica of the impedance matching network, a scaled replica of the head resistance fault threshold coupled in parallel with the scaled replica of the impedance matching network, and a second bipolar transistor network configured to generate mirror currents; and matched resistors coupled to receive the mirror currents and generate the threshold voltages.

20. The circuit of claim 1, wherein the programmable current mirror has a mirror ratio defined by a parallel combination of the scaled impedance matching network and the scaled fault threshold resistance.

\* \* \* \* \*